United States Patent [19]

Kamens

[11] 4,435,525

[45] Mar. 6, 1984

[54] REACTION OF CARBONYLHYDRAZINES AND ORGANIC PEROXIDES TO FOAM UNSATURATED POLYESTER RESINS

[75] Inventor: Ernest R. Kamens, Tonawanda, N.Y.

[73] Assignee: Pennwalt Corporation, Philadelphia, Pa.

[21] Appl. No.: 479,300

[22] Filed: Mar. 28, 1983

Related U.S. Application Data

[63] Continuation-in-part of Ser. No. 431,545, Sep. 30, 1982, Pat. No. 4,393,148.

[51] Int. Cl.$^3$ .......................... C08V 9/08; C08V 9/10
[52] U.S. Cl. ........................................ 521/92; 521/93; 521/95; 521/96; 521/123; 521/124; 521/128; 521/134; 521/138
[58] Field of Search ................. 521/182, 134, 138, 92, 521/93, 123, 124

[56] References Cited

U.S. PATENT DOCUMENTS

| | | | |
|---|---|---|---|
| 3,920,589 | 11/1975 | Jacobs et al. | 521/138 |
| 3,920,590 | 11/1975 | Jacobs et al. | 521/138 |
| 3,920,591 | 11/1975 | Jacobs et al. | 521/138 |

*Primary Examiner*—Morton Foelak

[57] ABSTRACT

Low density foams are prepared from an admixture which comprises a medium which is polymerizable and/or crosslinkable by free radical initiation, carbonylhydrazine blowing agent, a peroxide curing agent, a suitable surfactant, and at least one transition metal salt promoter wherein at least one of the metal salts is a compound of iron or copper. The blowing agent in the presence of an effective amount of the transitional metal salt promoter improves the efficiency of the process.

14 Claims, No Drawings

REACTION OF CARBONYLHYDRAZINES AND ORGANIC PEROXIDES TO FOAM UNSATURATED POLYESTER RESINS

This application is a continuation-in-part of Ser. No. 431,545, filed Sept. 30, 1982, now U.S. Pat. No. 4,393,148.

BACKGROUND OF THE INVENTION

This invention is related to the foaming of a medium which is polymerizable and/or crosslinkable by free radical initiation. More particularly, it comprehends the crosslinking of unsaturated polyester resins using carbonylhydrazine blowing agents with transition metal salt promoters.

The foaming and curing of unsaturated polyester resins are well known in the prior art. U.S. Pat. No. 3,920,589 discloses foaming and curing of an unsaturated polyester resin using a peroxide curing agent, a transition metal salt promoter, hydrazine or a sulfonyl hydrazide blowing agent, and a halogen redox compound. U.S. Pat. No. 3,920,590 discloses the foaming and curing of an unsaturated polyester resin using a peroxide curing agent, a cobalt promoter, and hydrazine or oxybis (benzesulfonyl) hydrazide blowing agent, wherein both the peroxide and cobalt are present in high concentration levels. U.S. Pat. No. 3,920,591 discloses the foaming and curing of an unsaturated polyester resin using a peroxide curing agent, organo-metallic salt promoters of transition metals, hydrazine or a sulfonyl hydrazide blowing agent, and an aliphatic amine redox compound. Published European patent application No. 0048050 discloses the foaming and curing of an unsaturated polyester resin using a peroxide curing agent, an organo-metallic salt promoter, and a t-alkyl hydrazine blowing agent. None of the above-mentioned prior art teaches the present invention.

SUMMARY OF THE INVENTION

The present invention pertains to a new foamable and curable composition comprising an admixture of a medium which is polymerizable and/or crosslinkable by free radical initiation, a peroxide, at least one transition metal salt promoter where at least one of the metals is selected from the class of iron and copper, and a carbonylhydrazine blowing agent. A suitable surfactant may also be included in this admixture. Foamed structures of varying low densities with a fine uniform cell structure and without cracks or voids are easily prepared from compositions of this invention.

DETAILED DESCRIPTION OF THE INVENTION POLYMERIZABLE MEDIUM

By the term "polymerizable medium" is meant the fluid phase with which the blowing agent, peroxide, metal salts, etc., are mixed. It is essential that one component in this medium be polymerizable or cross-linkable by free radical initiation, i.e. the component is a resin polymerizable or cross-linkable by free radical initiation or is a vinyl or vinylidene monomer. A detailed description of suitable polymerizable mediums is set forth in U.S. Pat. No. 3,993,609 where such mediums are indentified as typed A, B, C, D, or E and is herein incorporated by references.

Medium A: A reactive polymeric resin, or mixture of reactive resins, or a mixture of a reactive polymeric resin (or resins) with an unreactive resin or resins.

Medium B: Reactive resin(s) and/or unreactive resin(s) dissolved and/or dispersed in a polymerizable monomer or mixture of monomers.

Medium C: A reactive resin or mixture of resins at least one being reactive, dissolved or dispersed in an inert solvent or diluent.

Medium D: A monomer or mixture of monomers.

Medium E: Combinations of any or all of the above.

Many of the physical properties of the resultant foams will depend on the nature of the polymerizable medium in a manner well understood by those skilled in the art. Also, the number and spacig of cross-linkable functions in the resins will affect the degree of rigidity or flexibility of the cured foamed product as is well known to those skilled in the art. A wide variety of inert liquid diluents may be added to any of the above described polymerization media to give appropriate viscosity, physical properties and/or cost.

BLOWING AGENTS

The blowing agents which are useful in this invention are carbonylhydrazines having the following general structure:

where
X is selected from $R_1O-$, $R_2$,

and $H_2NNH-$;

$R_1$ can be alkyl of 1 to 20 carbons, cycloalkyl of 5 to 12 carbons, aralkyl of 7 to 18 carbons, aryl of 6 to 18 carbons, alkenyl of 2 to 20 carbons, alkynyl of 2 to 20 carbons, or a 5 or 6 membered heterocyclic containing a nitrogen, sulfur, or oxygen atom in the ring;

$R_2$ can be independently defined as $R_1$ or hydrogen;

$R_3$ can be a covalent bond or a diradical selected from alkylene of 1 to 16 carbons, alkenylene of 2 to 16 carbons, alkynylene of 2 to 16 carbons, cycloalkylene of 5 to 16 carbons, arylene of 6 to 18 carbons, or aralkylene of 7 to 18 carbons;

each of $R_1$, $R_2$, and $R_3$ can be branched or unbranched and optionally substituted with lower alkoxy, nitro, halogen, cyano, carboxy, hydroxy, lower acyloxy, aroyloxy, sulfo, lower alkoxycarbonyl, lower alkoxycarbonyloxy, N-substituted or unsubstituted carbamoyl and carbamoyloxy, lower thioalkoxy, lower thioacyloxy, lower dithioacyloxy, lower thioalkoxycarbonyl, lower dithioalkoxycarbonyl, lower thioalkoxycarbonyloxy, lower acyl, aroyl, and lower alkylsulfonato where lower alkyl includes 1 to 6 carbons; and $R_3$ can contain connective groups in the diradical backbone selected from the group consisting of

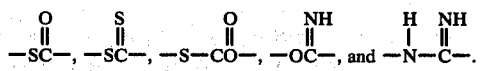

Examples of carbonylhydrazine blowing agents of this invention include but are not limited to the following:

(1) Acid hydrazides such as formic, acetic, propionic, hexanoic, oleic, lauric, stearic, benzoic, toluic, furoic, eicosanoic, phenylacetic, cinnamic, mandelic, dihydrocinnamic, acetylsalicylic, anthranilic, nitrobenzoic, chlorobenzoic, sulfobenzoic, thenoic, nicotinic, naphthoic, and crotonic hydrazide.

(2) dibasic acid dihydrazides sich as oxalic, malonic, succinic, glutaric, adipic, pimelic, suberic, azelaic, sebacic, maleic, fumaric, citraconic, phthalic, isophthalic, terephthalic, and tartaric dihydrazide.

(3) carbazates such as methyl, ethyl, propyl, isopropyl, t-butyl, sec.-butyl, isobutyl, n-butyl, hexyl, octyl, decyl, hexadecyl, octadecyl, benzyl, phenethyl, octenyl, allyl, cyclohexyl, cyclopentyl, phenyl, naphthyl, thenyl, furyl and propynyl carbazate.

(4) carbohydrazide.

The preferred blowing agents are 2-furoic acid hydrazide, acethydrazine, toluic acid hydrazide, succinic acid hydrazide, adipic acid dihydrazide, carbohydrazide, t-butyl carbazate, and ethyl carbazate.

These compounds are solids which can be dissolved in water or alcohol to facilitate mixing into the resin or dispensing through pumping and metering equipment.

These compounds provide good quality foams over a wide density range and in a variety of resin types.

Generally the amount of blowing agent can be varied over a relatively wide range to achieve desired foam densities; however, they are typically used in amounts ranging from about 0.1 to about 10 phr and preferably from about 0.2 to about 5 phr. The blowing agents may be used alone or in combination with other blowing agents.

PEROXIDES

The process of the present invention employs in conjunction with the liquid resin, compounds which are capable of forming free radicals. These compounds are typically peroxides which are capable of being activated by transition metal salts and/or amines.

Peroxides which are activated by transition metal salts include those that have the general structure:

R—O—O—H wherein R— can be H, alkyl, aralkyl or

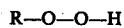

hydroxy and/or peroxy substituted alkyl. Examples of such useful peroxides include but are not limited to hydrogen peroxide, cumene hydroperoxide, t-butyl hydroperoxide, methyl ethyl ketone peroxide, 2,4-pentanedione peroxide, methyl isobutyl ketone peroxide and others.

Peroxides that are activated by amines include those that can be characterized by the general structure:

Useful peroxides of this type include the diacyl peroxides, for example, dibenzoyl peroxides, diisobutyryl peroxide, acetyl peroxide, 2,4-dichlorobenzoyl peroxide and lauroyl peroxide. Also, for example, the peroxydicarbonates such as di(n-propyl) peroxydicarbonate, di-(sec-butyl) peroxydicarbonate, di(2-ethylhexyl) peroxydicarbonate, di(2-phenoxyethyl) peroxydicarbonate, and the like may be used.

Peroxides which are especially useful for curing at low temperatures (i.e., 15°–30° C.) are the hydroperoxides, ketone peroxides and diacyl peroxides. These peroxides are well known to those skilled in the art. A detailed description of these compounds can be found in "Encyclopedia of Chemical Technology", Third Edition, Vol. 17, pp 27–90.

Mixtures of two or more peroxides may also be used in this invention wherein at least one of the peroxides is of the type which can be activated to cure low temperatures.

The preferred peroxides include hydroperoxides such as cumene hydroperoxide, peroxy derivatives of ketones such as methyl ethyl ketone peroxide and peroxydicarbonates such as di(sec-butyl) peroxydicarbonate. Solutions of methyl ethyl ketone peroxide in plasticizers are the most preferred. These are commercially available as solutions containing approximately 30–40 percent by weight of peroxidic compound(s) in plasticizers or solvents such as dimethyl phthalate.

As is well known by those skilled in the art the amount of peroxide used will depend upon the nature of the peroxide, the curing temperature, the resin employed, the amount of blowing agent and the type of blowing agent. The amount of peroxide can range from about 0.2 to about 20 parts per hundred parts of resin (phr) and preferably from about 0.5 to 10 phr. The ratio of peroxide to blowing agent is generally in the range of 1:1 to 10:1 and preferably 4:1 to 7:1 on a weight basis. Specific examples of useful and effective peroxide to blowing agent ratios are illustrated in the examples hereinafter.

PROMOTERS

In the practice of the present invention compounds of iron and copper are unique as promoters (also known as accelerators) in their ability to synchronize the gas generation and the curing reaction. If the resin cures before expansion and gas generation is complete, the foam is likely to contain splits, cracks, or other voids. On the other hand, if the resin does not gel sufficiently, gases will not be retained and high density foams with poor cell structure will result. When compounds of iron are employed as the promoter, the foams have a fine uniform cell structure and are free of splits, cracks, and other imperfections.

Examples of useful metal compounds include but are not limited to ferric chloride, ferrous chloride, ferrous naphthenate, ferrous sulfate, ferric sulfate, ferric nitrate, ferric ammonium sulfate, copper naphthenate, cupric chloride and cuprous chloride. The preferred metal salts are ferric chloride and ferrous chloride.

In the practice of the present invention, mixture of transition metal salts, wherein at least one of the metal salts is a compound of iron or copper, may be used advantageously. For example, cobalt salts may be used in combination with the aforementioned salts to increase the rate of foaming, if desired.

To facilitate mixing of the metal salt in the resin medium it is often desirable to dissolve the metal salt in a suitable solvent. The inorganic salts can generally be dissolved in a polar solvent such as alcohol or water.

The organic salts may be dissolved in solvents such as xylene, toluene, decane, etc.

Generally the amount of metal salt is in the range of about 0.01 to about 2.0, preferably 0.05 to 1.0 parts per 100 parts by weight of the resin. When metal copromoters such as cobalt salts are employed to obtain faster expansion or to increase the degree of cure in thin layers of foam, the amount of copromoter is genrally 0.0005 to 0.10, preferably 0.001 to 0.01, parts per 100 parts of resin on a weight basis. Generally the optimum amount of metal compound(s) utilized is dependent upon the specific metal compound and is influenced by compound characteristics such as solubility and compatibility in the resin medium.

PROCESSING CONDITIONS

In general and broadly stated in the process of the present invention, the combination of the blowing agent with a peroxide and compound of iron or copper in a free radically polymerizable medium generates gaseous decomposition products at room temperature to provide foamed polymeric structures. The reaction produces free radicals simultaneously with gas generation which initiate polymerization to provide a crosslinked matrix. At the initial stage of reaction, the matrix is partially crosslinked, i.e., the matrix has fluidity characteristics such that the gases generated cause the matrix to expand. The gas bubbles, dispersed through the gelled matrix, produce either a "closed" or "open" cell configuration depending upon the amount and rate of evolution of the gas and the fluidity and strength characteristics of the resin medium during the period of gas generation. The major portion of the crosslinking reaction occurs after gas generation has ceased. This stage of reaction is accompanied by significant increase in temperature. When the optimum concentration of reactants is employed, the resulting expanded and shaped resin is fully cured without the need for further post curing.

Thus, in the process of the present invention, the physical environmental conditions of temperature and pressure, the manipulative techniques and equipment employed in mixing components, and the shaping of the cellular structure during or after its production as well as after-treating by curing, and the like, may vary widely. Some such variables are discussed in greater detail below for illustrative purposes.

MIXING TECHNIQUES

Any conventional mixing method can be used to distribute the reactants throughout the resin medium. It is well known to those skilled in the art that organic peroxides and promoters should not be mixed together directly. Such direct contact can result in hazardous decomposition of the peroxide. To avoid such contact the reactive ingredients are preferably added to the resin in the following order: metal salt(s), blowing agent, peroxide. Each ingredient should be thoroughly mixed into the resin before adding the next ingredient. The peroxide may also be added as a second component in processes (eg. spray-up) where the equipment is designed to dispense a mixture of resin promotor(s) and blowing agent as one component and peroxide as a separate component.

Temperature Variation

Generally the reaction will occur at normal room temperatures (ie., 15°-30° C.) and the speed of reaction at such temperatures will usually be suitable. The use of lower or higher temperatures may also be used.

Optional Additives to Medium

The density of the foamed product structure can be controlled by the amount of reactants employed. In addition, the amount of foaming and hence the density of the final cellular structure, can be augmented by the use of gases or liquids in the resin medium which have boiling points such that the liquids vaporize during either the blowing or curing reaction. Liquids or gases of this class generally exhibit significant vapor pressure below the curing temperatures. Representative examples are as follows: pentane, hexane, heptane, cis-2-butene, trans-2-butene, $CFCl_3$, and $C_2F_3Cl_3$.

Other compounds that varporize below 100° C. can be used to enhance foaming such that densities in the range of 1–5 lb/ft$^3$ are easily obtained.

It has also been found useful to add surfactants to the resin medium to promote uniformity of cell size in the final product. Such additives are particularly valuable in systems employing high concentrations of the blowing reactants. Such surfactants may be of the cationic (quaternary salts), anionic (sulfonates) and nonionic (ethylene oxide condensates or block copolymers) type. Some suitable surfactants include materials such as: metallic soaps, alkylene oxide-phenol addition products, alkyl aryl sulfates and sulfonates, dimethyl siloxane polymers, and cationic siloxanes of the general formula shown in U.S. Pat. No. 3,642,670 which are herein incorporated by reference. Air will also serve as a nucleating agent. Only a small amount, well dispersed as small bubbles throughout the resin, is needed (as distinguished from the case where one attempts to foam the resin by beating air into it). It is sufficient to mix the resin medium with the blowing compound hereof (and other components hereof as desired) in the presence of air. In the experiments hereof carried out in paper cups and the like, this was accomplished simply by mixing with an electric stirrer. When one uses molding equipment involving pumped stream(s) and a mixing head, one simply bleeds some air into the mixing head.

Hollow ceramic, glass, or graphite spheres can be added to the resin medium in order to decrease further the density of the final formed structure. These materials have densities less than that of the polymerized matrix and can be utilized to impart desired density or decorative properties to the foam.

Fillers may be used as components in any of the reactive mediums described above following techniques well known to those skilled in the art of casting and molding resins. Fillers improve fabrication characteristics, reduce shrinkage, lower cost, and improve physical properties. A wide variety of fillers have been found to be compatible with the foaming process of this invention. Milled fiberglass and cotton flock are re-enforcing fillers and tend to increase green strength, compressive strength and impact strength. Bulk fillers such as wood flours, clays, carbonates, and silicates decrease the cost and reduce thermo-expansion and shrinkage. Mineral fillers such as borax and alum are known to effectively reduce the burning rates. Examples of fillers include the following: pecan shell flour, milled fiberglass, wood chips, sawdust, vermiculite, carbon black, magnesium sulfate, cotton flock, calcium carbonate, mica steel wire, aluminum powder, polystrene powder, polypropylene powder, polyethylene powder, polyvinylchloride powder, and powdered crosslinked butadieneacrylonitrile rubber.

EXAMPLES

The following examples are provided to illustrate preferred embodiments of the invention and are not intended to restrict the scope thereof. All parts are parts by weight and percentages are expressed as weight percentages unless indicated otherwise.

Standard Procedure

The resins* and all other components except the peroxide curing agent were weighed into 9-ounce waxed paper cups and blended using a high shear electric mixer. The peroxide curing agent was then added and blended in; at this time an electric timer was activated in order to obtain gel times (time to peak foaming). After mixing at high shear for about 10-seconds, 30 gram portions of the mixtures were poured into 3-ounce paper cups and allowed to foam. Gel times and foam densities were determined from these samples. Densities were determined by the water displacement method. This standard procedure was used in all of the experiments unless indicated otherwise.

*Laminac PDL-989 containing 5 phr additional styrene monomer and 1.0 phr of Dow Corning 193 surfactant—Laminac PDL-989 is an isophthalic acid-based, general purpose molding resin produced by U.S. Chemicals. The resin contains approximately 35% styrene monomer.

EXAMPLE 1

Blowing agent of the present invention were tested as indicated in the table below. The concentration of MEKP (LUPERSOL DDM-9[1]) curing agent was 3.0 phr in all cases.

For the sake of comparison, prior art blowing agents, sulfonyl hydrazides and t-butylhydrazine, were also tested and the results are also listed in the table below.

| Blowing Agent | | g Soln/100 g Resin | 45% Aqueous $FeCl_3$ g Soln/100 g Resin | Foam Density $Lb/Ft^3$ |
|---|---|---|---|---|
| Chemical Name | % in Diluent | | | |
| 2-Furoic acid hydrazide | 50% - DMF[2] | 1.35 | 0.5 | 37 |
| Acethydrazide | 40% - Methanol | 1.0 | 0.5 | 32 |
| p-Toluic acid hydrazide | 30% - DMF | 2.7 | 0.5 | 37 |
| Succinic acid dihydrazide | 14% - $H_2O$ | 2.8 | 0.5 | 27 |
| Adipic acid dihydrazide | 14% - $H_2O$ | 3.4 | 0.5 | 31 |
| Carbohydrazide | 25% - $H_2O$ | 1.0 | 0.3 | 28 |
| t-Butyl carbazate | 50% - Methanol | 1.4 | 0.5 | 35 |
| Ethyl carbazate | 40% - $H_2O$ | 1.1 | 0.75 | 33 |
| Prior Art Compounds | | | | |
| t-Butyl hydrazine | 58% - $H_2O$ | 0.82 | 0.5 | 70 |
| Benzene sulfonylhydrazine | 50% - DMF | 1.8 | 0.5 | — |
| p-Toluene sulfonylhydrazide | 50% - DMF | 2.0 | 0.5 | — |
| 4,4-Oxybis-(benzene-sulfonylhydrazide) | 40% - DMF | 2.4 | 0.5 | — |

[1]LUPERSOL DDM-9 is a methyl ethyl ketone peroxide containing 9% active oxygen, available from Pennwalt Corporation, Lucidol Divison.
[2]DMF = N,N—Dimethylformamide This table shows that a wide variety of blowing agents have been found to be useful in this invention.

This table also shows that the prior art compounds are not effective in the present invention. Although t-butylhydrazine gels the resin, it does not significantly foam the resin. The sulfonyl hydrazides evolved gas very slowly in the resin, eventually gelling the resin with little or no apparent foam being produced.

EXAMPLE 2

This example illustrates the use of a mixture of metal salts as promoters for the foaming/curing reaction.

| Component (g) | 1 | 2 | 3 |
|---|---|---|---|
| Resin | 100 | 100 | 100 |
| 50% Ethyl carbazate in MeOH | 1.1 | — | — |
| 50% t-Butyl carbazate in MeOH | — | 1.4 | 1.4 |
| 45% Aqueous $FeCl_3$ | 0.75 | 0.5 | 0.75 |
| 8% Copper naphthenate | 0.05 | 0.05 | 0.05 |
| LUPERSOL DDM-9 | 3.0 | 3.0 | 3.0 |
| Gel times, seconds | 100 | 55 | 55 |
| Foam density, $Lb/Ft^3$ | 27 | 30 | 22 |

These results show that mixtures of iron and copper salts are effective promoters for providing efficient foaming and curing especially when foaming thin layers less than ¼ inch in thickness.

EXAMPLE 3

Cumene hydroperoxide was tested as the peroxide component of the formulation and the results were recorded in the following table:

| Component (phr) | |
|---|---|
| Resin | 100 |
| 45% $FeCl_3$ in $H_2O$ | 0.3 |
| 86% Cumene hydroperoxide | 3.0 |
| 25% Carbohydrazide in $H_2O$ | 1.0 |
| Gel time (seconds) | 60 |
| Foam density $(Lb/Ft^3)$ | 33 |

These results illustrate that hydroperoxides are useful in the process of the present invention. Hydroperoxides, as well as the ketone peroxides used in previous examples, provide foams with fine uniform cell structure and good physical properties.

EXAMPLE 4

Foaming of a Vinyl Ester Resin

Rigid foams may also be prepared from resins that are terminated by polymerizable unsaturated ester function. These resins are diluted with styrene monomer.

| Component | Grams |
| --- | --- |
| Derakane 790 | 90 |
| Styrene | 9 |
| Dow Corning 193 Surfactant | 1.0 |
| 45% Aqueous FeCl$_3$ | 0.3 |
| 6% Cobalt nahpthenate | 0.3 |
| 50% t-Butyl carbazate in methanol | 1.4 |
| Gel time | 160 seconds |
| Foam density | 32.5 Lb/Ft$^3$ |

This example illustrates foams prepared from polymerizable medium type B, i.e., reactive resin dissolved in a polymerizable monomer.

EXAMPLE 5

Foaming of Acrylic Monomer

This example illustrates foams prepared from polymerizable medium type D, i.e., a monomer.

| Component | Grams |
| --- | --- |
| Trimethyolpropanetrimethacrylate | 50 |
| Alumina trihydrate filler | 50 |
| Dow Corning 193 Surfactant | 1.0 |
| 50% t-Butyl carbazate in methanol | 1.5 |
| 45% Aqueous FeCl$_3$ | 1.0 |
| Lupersol DDM-9 | 3.0 |
| Gel time | 20 seconds |
| Foam density | 34 Lb/Ft$^3$ |

EXAMPLE 6

Foaming a Methylmethacrylate Syrup

This example illustrates foams prepared from polymerizable medium type B, i.e., unreactive resin dissolved in a polymerizable monomer.

| Component | Grams |
| --- | --- |
| MMA/PMMA syrup* | 80 |
| Trimethyolpropanetrimethacrylate | 20 |
| Dow Corning 193 Surfactant | 1.0 |
| 45% Aqueous FeCl$_3$ | 0.1 |
| N,N—Dimethylanaline | 0.5 |
| 25% Aqueous carbohydrazide | 1.0 |
| 86% Cumene hydroperoxide | 4.0 |
| Gel time | 300 seconds |
| Foam density | 29 Lb/Ft$^3$ |

*Prepared by dissolving 35 parts by weight of Elvacite 2009 in 65 parts of methylmethacrylate. Elvacite 2009 is polymethylmethacrylate available from Du Pont.

What is claimed:

1. A foamable and curable composition consisting essentially of an admixture of a medium selected from the class consisting of (i) an unsaturated polyester and at least one polymerizable unsaturated monomer, (ii) polymethylmethyacrylate and at least one polymerizable unsaturated monomer, (iii) polyethers that are terminated by polymerizable unsaturated ester functions and at least one polymerizable monomer, and (iv) polymerizable monomers, said polymers having been dissolved or dispersed in said polymerizable monomers, a peroxide, at least one transition metal salt promoter wherein at least one of the metals is selected from the group consisting of iron and copper, and a carbonylhydrazine blowing agent.

2. The composition of claim 1 wherein the blowing agent has the following structure $$X-\overset{O}{\underset{\|}{C}}NHNH_2$$

where
X is selected from R$_1$O—, R$_2$, $$H_2NNH\overset{O}{\underset{\|}{C}}R_3-,$$

and H$_2$NNH—,

R$_1$ is selected from the group consisting of alkyl of 1 to 20 carbons, cycloalkyl of 5 to 12 carbons, aralkyl of 7 to 18 carbons, aryl of 6 to 18 carbons, alkenyl of 2 to 20 carbons, alkynyl of 2 to 20 carbons, and a 5 or 6 membered heterocyclic containing a nitrogen, sulfur, or oxygen atom in the ring, R$_2$ is independently selected from R$_1$ or hydrogen, R$_3$ is a covalent bond or a diradical selected from the group consisting of alkylene of 1 to 16 carbons, alkenylene of 2 to 16 carbons, alkynylene of 2 to 16 carbons, cycloalkylene of 5 to 16 carbons, arylene of 6 to 18 carbons, and aralkylene of 7 to 18 carbons, wherein each of R$_1$, R$_2$, and R$_3$ can be a branched or unbranched moiety and may be substituted with lower alkoxyl nitro, halogen, cyano, carboxy, hydroxy, lower acyloxy, aroyloxy, sulfo, lower alkoxycarbonyl, lower alkoxycarbonyloxy, N-substituted or unsubstituted carbamoyl and carbamoyloxy, lower thioalkoxy, lower thioacyloxy, lower dithioacyloxy, lower thioalkoxycarbonyl, lower dithioalkoxcarbonyl, lower thioalkoxycarbonyloxy, lower acyl, aroyl, and lower alkylsulfonato, wherein the lower alkyl has 1 to 6 carbon, and R$_3$ can contain connective groups in the diradical backbone selected from the group consisting of

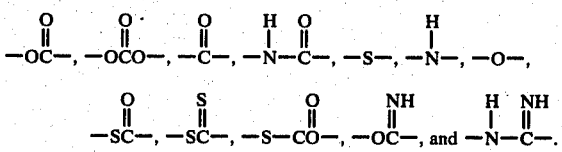

3. The composition of claim 2 wherein the blowing agent is selected from the group consisting of 2 furoic acid hydrazide, acethydrazine, toluic acidhydrazide, succinic acid hydrazide, adipic acid dihydrazide, carbohydrazide, t-butyl carbazate, and ethyl carbazate.

4. The composition of claim 1 wherein the concentration of the medium is 100 parts, the peroxide is from about 0.2 to about 20 parts, the promoter is from about 0.01 to 2.0 parts, and the blowing agent is from about 0.2 to about 10 parts.

5. The composition of claim 4 wherein the concentration of the peroxide is from about 0.5 to about 10 parts, the promoter is from about 0.05 to about 1.0 parts, and the blowing agent is from about 0.2 to about 5 parts.

6. The composition of claim 1 wherein a suitable surfactant is present in the composition.

7. The composition of claim 1 wherein said medium is an unsaturated polyester resin admixed with a polymerizable unsaturated monomer.

8. The composition of claim 1 wherein said peroxide is selected from the group consisting of hydrogen peroxide, hydroperoxide, diacyl peroxide, peroxydicarbonate and ketone peroxide.

9. The composition of claim 1 wherein the promoter is selected from the group consisting of ferric chloride, ferrous chloride, cuprous chloride, cupric chloride, and copper naphthenate.

10. A method for preparing a foam and cured resin comprising reacting the composition of claim 1 at ambient temperatures until foaming and curing have been effected.

11. The method of claim 10 where to the resin reaction mixture first the metal salt is added, next the blowing agent is added, and then the peroxide is added, wherein each ingredient is throughly mixed when added.

12. The method of claim 10 wherein the resin is an unsaturated polyester resin admixed with a polymerizable unsaturated monomer.

13. The method of claim 10 wherein the density of the foamed and cured resin is controlled by controlling the blowing agent and metal salt promoter.

14. The foamed and cured polyester resin product prepared by the method of claim 10 having a low density and fine cellular structure.

* * * * *